United States Patent
Adams et al.

[11] Patent Number: 5,988,397
[45] Date of Patent: Nov. 23, 1999

[54] SCREEN FOR VIBRATORY SEPARATOR

[75] Inventors: Thomas C. Adams, Hockley, Tex.;
David L. Schulte, Jr., Broussard, La.;
Guy L. McClung, III, Spring, Tex.

[73] Assignee: Tuboscope I/P, Inc., Houston, Tex.

[21] Appl. No.: 08/895,976

[22] Filed: Jul. 17, 1997

Related U.S. Application Data

[63] Continuation-in-part of application No. 08/786,515, Jan. 21, 1997, and application No. 08/598,566, Feb. 12, 1996.

[51] Int. Cl.$^6$ .............................. B07B 1/49; B01D 29/00; B01D 29/07
[52] U.S. Cl. ..................... 209/401; 209/399; 209/397; 210/488; 210/493.5; 210/498; 210/499
[58] Field of Search .................................. 209/397, 399, 209/401, 403; 210/488, 489, 493.1, 493.3, 493.5, 498, 499

[56] References Cited

U.S. PATENT DOCUMENTS

| | | |
|---|---|---|
| H1481 | 9/1995 | Ray ............................................ 428/98 |
| 40,242 | 10/1863 | Capell . |
| 236,416 | 1/1881 | Bourne . |
| 246,144 | 8/1881 | Keeler . |
| 268,491 | 12/1882 | Hubbell . |
| 275,190 | 4/1883 | Gilbert . |
| 275,340 | 4/1883 | Kimball . |
| 500,302 | 6/1893 | Stoecket et al. . |
| 516,673 | 3/1894 | Wilson . |
| 526,562 | 9/1894 | Cross . |
| 560,858 | 5/1896 | Missroon . |
| 583,981 | 6/1897 | Plaisted . |
| 607,598 | 7/1898 | Closz . |
| 777,317 | 12/1904 | Traylor . |
| 865,185 | 9/1907 | Kerrigan . |
| 948,222 | 2/1910 | Honabach . |
| 964,897 | 7/1910 | Bryant . |
| 966,578 | 8/1910 | Murphy et al. ..................... 209/401 X |
| 984,866 | 2/1911 | Tate . |
| 1,098,979 | 6/1914 | Schuchard . |
| 1,132,667 | 3/1915 | Milliot . |
| 1,139,041 | 5/1915 | Larson . |
| 1,242,982 | 10/1917 | Reynolds . |
| 1,248,081 | 11/1917 | Couch . |
| 1,250,768 | 12/1917 | Baumgartner ........................... 209/392 |
| 1,344,747 | 6/1920 | Wright . |
| 1,397,339 | 11/1921 | Sturtevant . |
| 1,423,021 | 7/1922 | Reynolds . |
| 1,462,804 | 7/1923 | Evans . |
| 1,505,735 | 8/1924 | Stebbins . |
| 1,561,632 | 11/1925 | Woodward . |
| 1,614,586 | 10/1927 | Anderson et al. . |
| 1,626,774 | 5/1927 | Allan . |
| 1,678,941 | 7/1928 | Helman . |
| 1,713,143 | 5/1929 | Overstrom . |
| 1,716,758 | 6/1929 | Bland . |
| 1,785,195 | 12/1930 | Hoes et al. . |
| 1,879,377 | 9/1932 | McNeely . |
| 1,950,861 | 3/1934 | O'Toole, Sr. . |
| 1,997,713 | 4/1935 | Boehm . |
| 1,997,740 | 4/1935 | Nickerson . |
| 2,052,467 | 8/1936 | Hermann ................................. 209/401 |
| 2,061,850 | 11/1936 | Roberts . |
| 2,082,513 | 6/1937 | Roberts . |
| 2,089,548 | 8/1937 | Frantz et al. . |
| 2,104,785 | 1/1938 | Akeyson ................................ 210/384 |
| 2,190,262 | 2/1940 | Geist . |
| 2,251,909 | 8/1941 | Lindsay ................................. 210/149 |
| 2,274,700 | 3/1942 | Jenks . |
| 2,335,084 | 11/1943 | Rice ...................................... 209/408 |
| 2,406,051 | 8/1946 | Weiss . |
| 2,462,878 | 3/1949 | Logue . |
| 2,480,320 | 8/1949 | Carrier .................................. 210/388 |
| 2,511,239 | 6/1950 | Behnke et al. .......................... 209/403 |
| 2,648,441 | 8/1953 | Soldan . |
| 2,667,975 | 2/1954 | Seaholm ................................ 210/152 |
| 2,670,079 | 2/1954 | Betts ..................................... 209/405 |
| 2,677,462 | 5/1954 | Conkling ................................ 209/403 |
| 2,723,032 | 11/1955 | Gisler et al. . |
| 2,726,184 | 12/1955 | Cox et al. . |
| 2,774,477 | 12/1956 | Pollitz ................................... 209/403 |
| 2,800,227 | 7/1957 | Kiger ................................. 209/412 X |
| 2,813,629 | 11/1957 | Brugmann .............................. 209/403 |
| 2,827,169 | 3/1958 | Cusi . |
| 2,902,165 | 9/1959 | Imershein . |
| 2,929,464 | 3/1960 | Sprouse . |
| 2,973,865 | 3/1961 | Cibula ................................ 209/392 X |
| 2,980,208 | 4/1961 | Neumann . |
| 2,985,303 | 5/1961 | Wright . |
| 3,057,481 | 10/1962 | Pale ...................................... 210/493 |

5,988,397
Page 2

| | | | |
|---|---|---|---|
| 3,070,231 | 12/1962 | McCorkel et al. | 209/319 |
| 3,092,573 | 6/1963 | Lambert et al. | 209/403 |
| 3,165,473 | 1/1965 | Pall et al. | 210/510 |
| 3,176,843 | 4/1965 | Hoskins et al. | 209/403 |
| 3,243,943 | 4/1966 | Getzin | 55/499 |
| 3,255,885 | 6/1966 | Burls | 209/314 |
| 3,285,413 | 11/1966 | Taylor-Smith . | |
| 3,458,978 | 8/1969 | Davis | 55/499 |
| 3,465,413 | 9/1969 | Rosaen et al. | 29/428 |
| 3,542,636 | 11/1970 | Wandel | 161/114 |
| 3,574,103 | 4/1971 | Latkin | 428/72 |
| 3,655,060 | 4/1972 | Hagdahl | 210/493 |
| 3,679,057 | 7/1972 | Perez | 210/223 |
| 3,716,138 | 2/1973 | Lumsden | 209/401 |
| 3,747,770 | 7/1973 | Zentis | 210/402 |
| 3,747,772 | 7/1973 | Brown | 210/493 |
| 3,789,498 | 2/1974 | Cole | 29/470.9 |
| 3,793,692 | 2/1974 | Tate et al. | 29/163.5 |
| 3,853,529 | 12/1974 | Boothe et al. | 55/499 |
| 3,900,628 | 8/1975 | Stewart . | |
| 4,019,987 | 4/1977 | Krashow | 210/232 |
| 4,022,596 | 5/1977 | Pedersen | 55/528 |
| 4,033,865 | 7/1977 | Derrick, Jr. | 209/275 |
| 4,062,769 | 12/1977 | Simonson | 209/399 |
| 4,075,106 | 2/1978 | Yamazaki | 210/487 |
| 4,138,303 | 2/1979 | Taylor | 156/264 |
| 4,380,494 | 4/1983 | Wilson | 209/319 |
| 4,410,427 | 10/1983 | Wydeven | 210/317 |
| 4,464,242 | 8/1984 | Boulton | 204/253 |
| 4,472,473 | 9/1984 | Davis et al. | 428/184 |
| 4,546,783 | 10/1985 | Lott | 134/109 |
| 4,575,421 | 3/1986 | Derrick et al. | 209/397 |
| 4,582,597 | 4/1986 | Huber | 204/313 |
| 4,589,983 | 5/1986 | Wydevan | 210/317 |
| 4,617,122 | 10/1986 | Kruse et al. | 210/493.3 |
| 4,634,535 | 1/1987 | Lott | 210/780 |
| 4,678,578 | 7/1987 | Nodes et al. | 210/445 |
| 4,696,751 | 9/1987 | Eifling | 210/780 |
| 4,728,422 | 3/1988 | Bailey | 210/314 |
| 4,769,968 | 9/1988 | Davis et al. | 52/814 |
| 4,820,407 | 4/1989 | Lilie | 209/397 |
| 4,832,834 | 5/1989 | Baird, Jr. | 209/397 |
| 4,857,176 | 8/1989 | Derrick et al. | 209/392 |
| 4,882,044 | 11/1989 | Friessle | 209/319 |
| 4,882,054 | 11/1989 | Derrick et al. | 210/389 |
| 5,028,474 | 7/1991 | Czaplicki | 428/178 |
| 5,056,286 | 10/1991 | Bokor | 52/483 |
| 5,084,178 | 1/1992 | Miller et al. | 210/493.5 |
| 5,137,622 | 8/1992 | Souter | 209/403 |
| 5,139,154 | 8/1992 | Gero et al. | 209/273 |
| 5,162,143 | 11/1992 | Porter et al. | 428/179 |
| 5,167,740 | 12/1992 | Michaelis et al. | 156/73.1 |
| 5,211,291 | 5/1993 | Kelley et al. | 209/680 |
| 5,221,008 | 6/1993 | Derrick, Jr. et al. | 209/269 |
| 5,256,292 | 10/1993 | Cagle | 210/499 |
| 5,312,508 | 5/1994 | Chisholm | 156/292 |
| 5,330,057 | 7/1994 | Schiller et al. | 209/392 |
| 5,385,669 | 1/1995 | Leone, Sr. | 210/488 |
| 5,392,925 | 2/1995 | Seyffert | 209/405 |
| 5,417,793 | 5/1995 | Bakula | 156/308.2 |
| 5,417,858 | 5/1995 | Derrick et al. | 210/388 |
| 5,417,859 | 5/1995 | Bakula | 210/388 |
| 5,490,598 | 2/1996 | Adams | 209/403 X |
| 5,614,094 | 3/1997 | Deister et al. | 210/388 |
| 5,636,749 | 6/1997 | Wojciechowski | 209/403 |
| 5,699,918 | 12/1997 | Dunn | 209/397 |
| 5,720,881 | 2/1998 | Derrick et al. | 210/388 |
| 5,816,413 | 10/1998 | Boccabella et al. | 209/399 |
| 5,851,393 | 12/1998 | Carr et al. | 204/489 |
| 5,868,929 | 9/1999 | Derrick et al. | 210/388 |

FOREIGN PATENT DOCUMENTS

| | | |
|---|---|---|
| 2912228 | 10/1980 | Germany . |
| 3827259 | 4/1989 | Germany . |
| 8904477U | 11/1989 | Germany . |
| 59-142818 | 8/1984 | Japan . |
| 269877 | 4/1928 | United Kingdom . |
| 519680 | 4/1940 | United Kingdom . |
| 823648 | 11/1959 | United Kingdom . |
| 1412975 | 11/1975 | United Kingdom . |
| 2124099 | 2/1984 | United Kingdom . |
| 2161715 | 1/1986 | United Kingdom . |
| 2161715B | 1/1986 | United Kingdom . |
| PCT/GB91/ 00957 | 1/1992 | WIPO . |
| WO 9200133 | 1/1992 | WIPO . |
| PCT/US94/ 00243 | 7/1994 | WIPO . |
| WO 9415723 | 7/1994 | WIPO . |
| WO 9611070 | 4/1996 | WIPO . |
| PCT/EP96/ 03103 | 2/1997 | WIPO . |
| WO 9703765 | 2/1997 | WIPO . |
| WO 9523655 | 9/1998 | WIPO . |

OTHER PUBLICATIONS

U.S. Serial No. 08/282,983; filed Jul. 29, 1994 entitled "Shale Shaker Screens," co–owned with present invention/ application.

"Derrick Sandwich Shaker," Derrick Equipment Co. (Prior to 1992).

"The Future of Fine Screening," Derrick Equipment Co. 1993.

"Derrick Pyramid Screens," Derrick Corp.

"Advanced Wirecloth, Inc.," Advanced Wirecloth, Inc., 1993.

"CPI Group, Inc.," CPI Group, Inc., 1990.

"LM3 Full–Flo™ Shale Shaker," Sweco Oilfield Services, 1991.

U.S. Application 08/220,101 filed Mar. 30, 1994 entitled "Screen For Vibrating Separator," pending.

Official Gazette Entry for U.S. Patent 5,626,234, May 6, 1997.

The Brandt Company General Catalog 1982–1983, 4 pages, 1982.

Take the Drilled Solids Out, The Brandt Company, Sep. 1980.

Sweco Full–Flow, Sweco, Inc. 1992.

Catalog 105 H&K Perforated Materials, Harrington & King–Perforating Co., 1988.

Sweco Oilfield Services, Composite Catalog, 1992.

Screening Equipment Handbook, Pankratz, 1988.

Supertaut Mud Cleaner Screens, Sweco Oilfield Services, 1992.

Filtration & Separation, Flo Trend Systems, Inc. 1989.

Clean Liquids/Dry Solids, Flo Trend Systems, Inc. 1989.

Mcnally Coal Preparation Manual M 576, pp. iii,73–96, 216 (1978).

"Layered Shale Shaker Screens Improve Mud Solids Control," World Oil, 1978.

Int'l Search Report, PCT/GB97/00385 co–owned with present application.

*Primary Examiner*—William E. Terrell
*Assistant Examiner*—Joe Dillon, Jr.
*Attorney, Agent, or Firm*—Guy McClung

[57] ABSTRACT

A screen for a vibratory shaker having a frame with multiple openings. Screen modules or plugs are disposed in each opening. Further disclosed is a mounting apparatus for securing the screen plugs in the openings and a support strip for supporting part of a screen having at least one upturned finger projecting above the top surface of the support body configured for contacting and supporting at least a part of a raised portion of the frame. A plug or module disposed in an opening of a positioning member of a screen assembly for a vibratory separator receives fluid with material therein for separation therefrom. Additionally disclosed is a method for making a plate mesh combination.

16 Claims, 10 Drawing Sheets

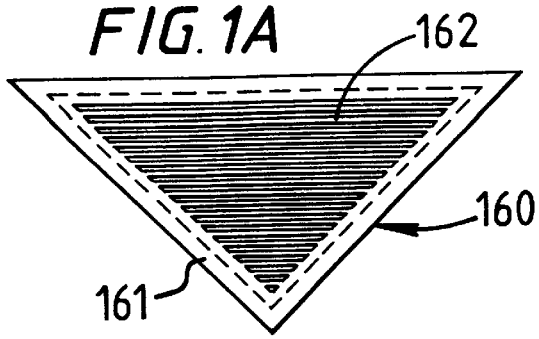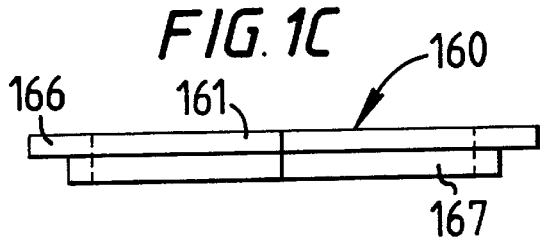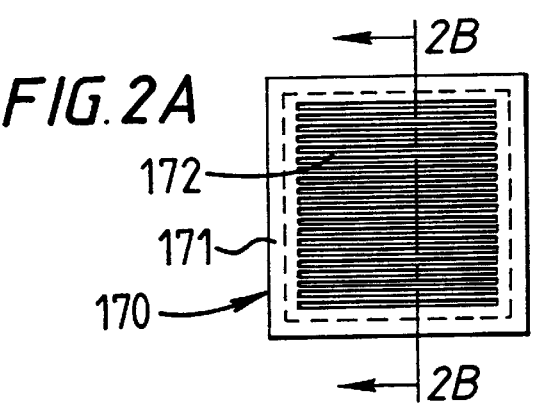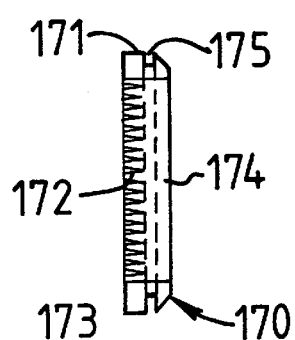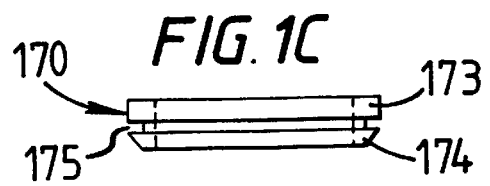

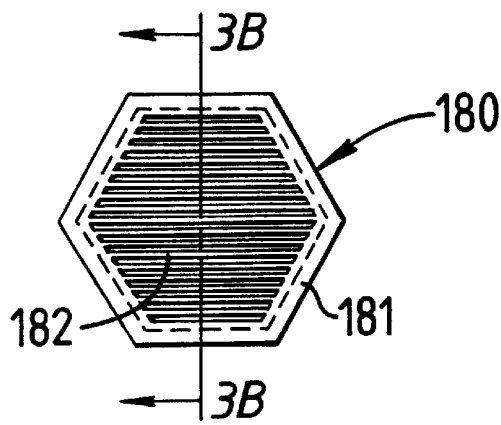
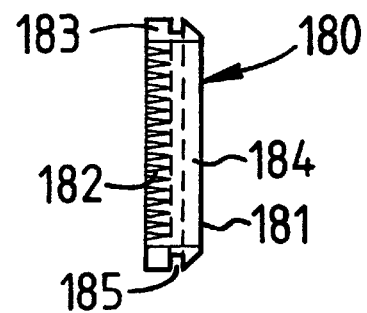
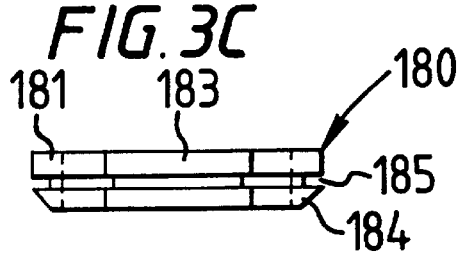
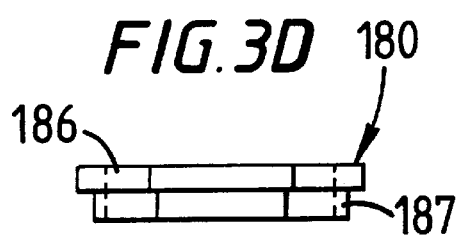
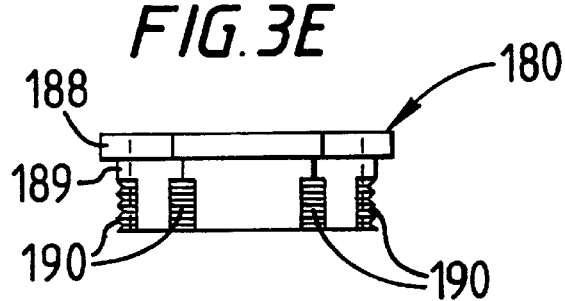
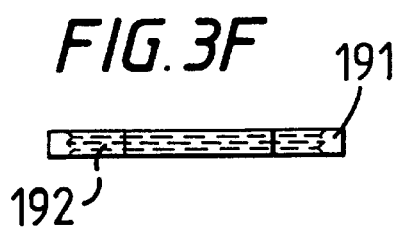

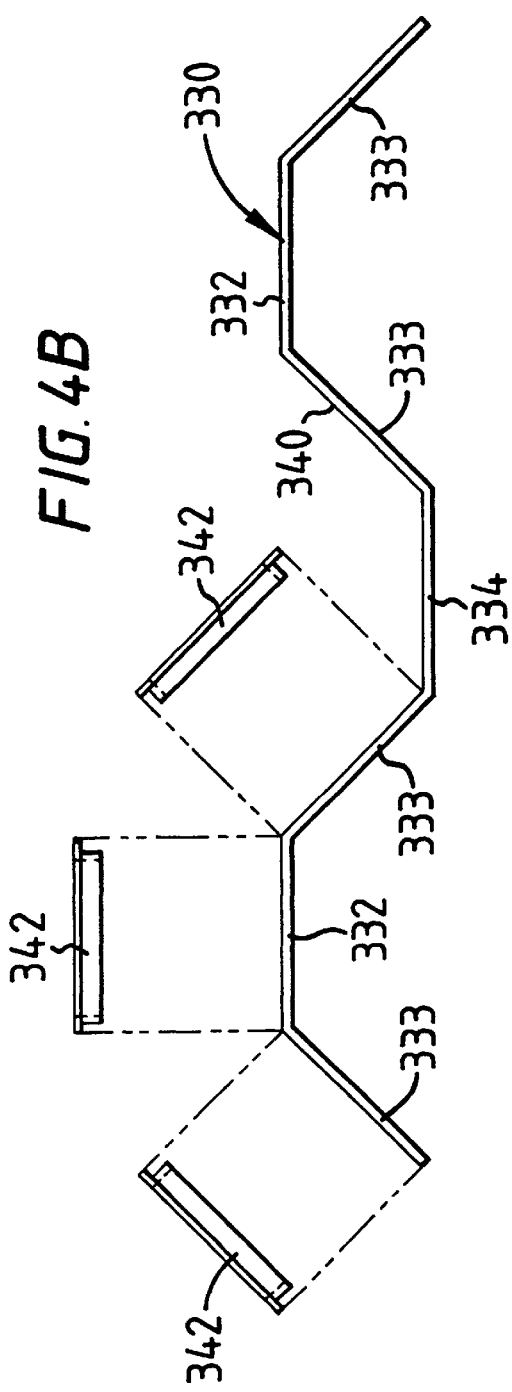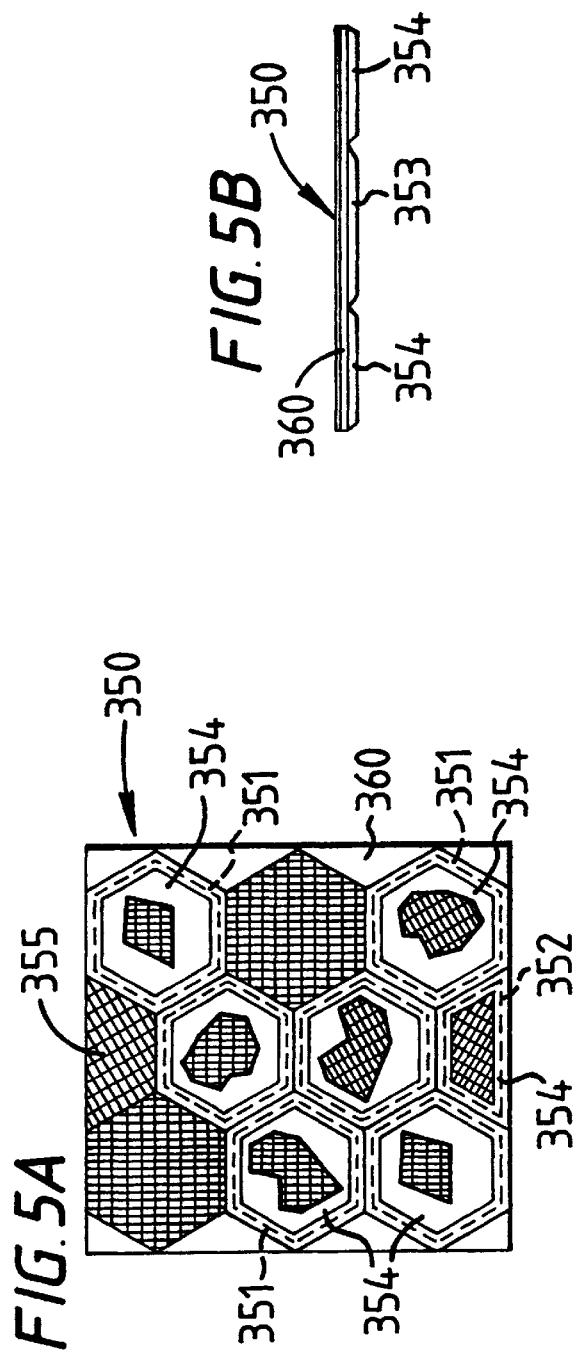

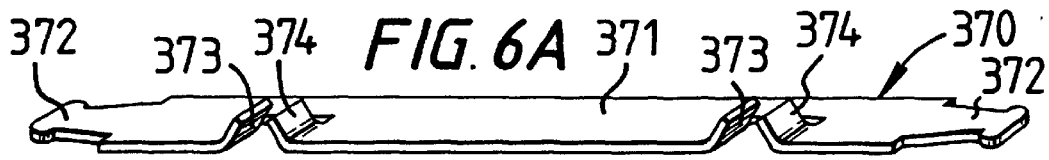
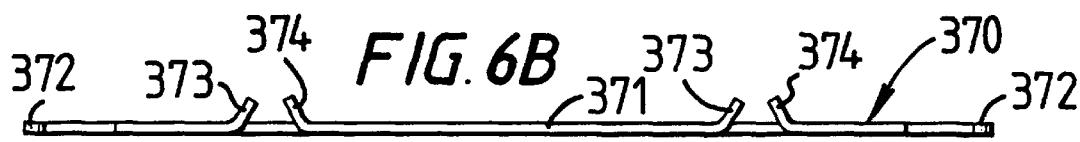
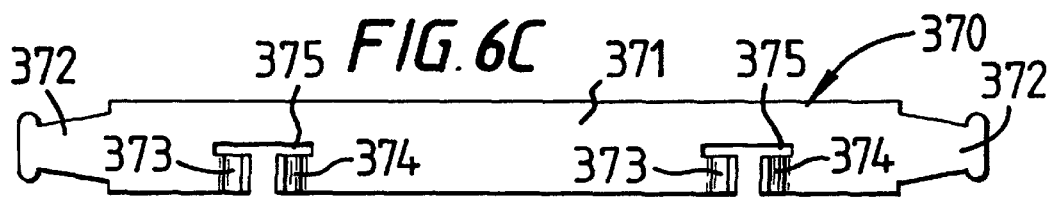
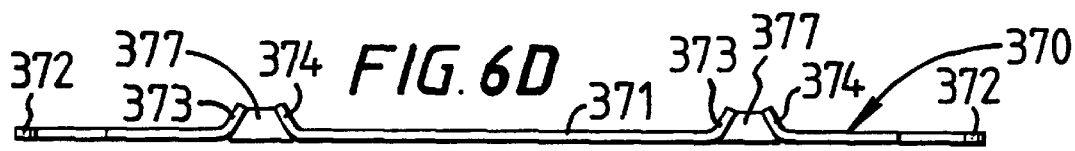
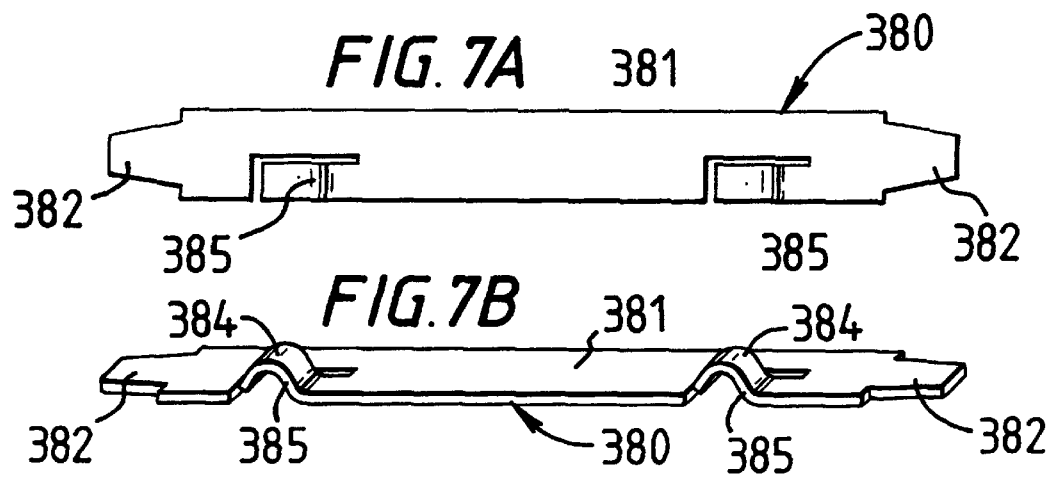

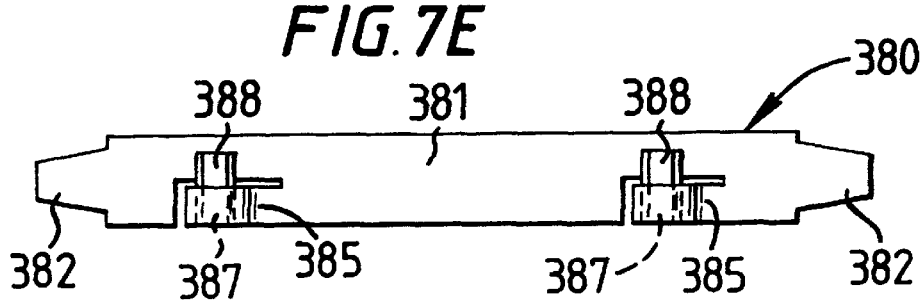
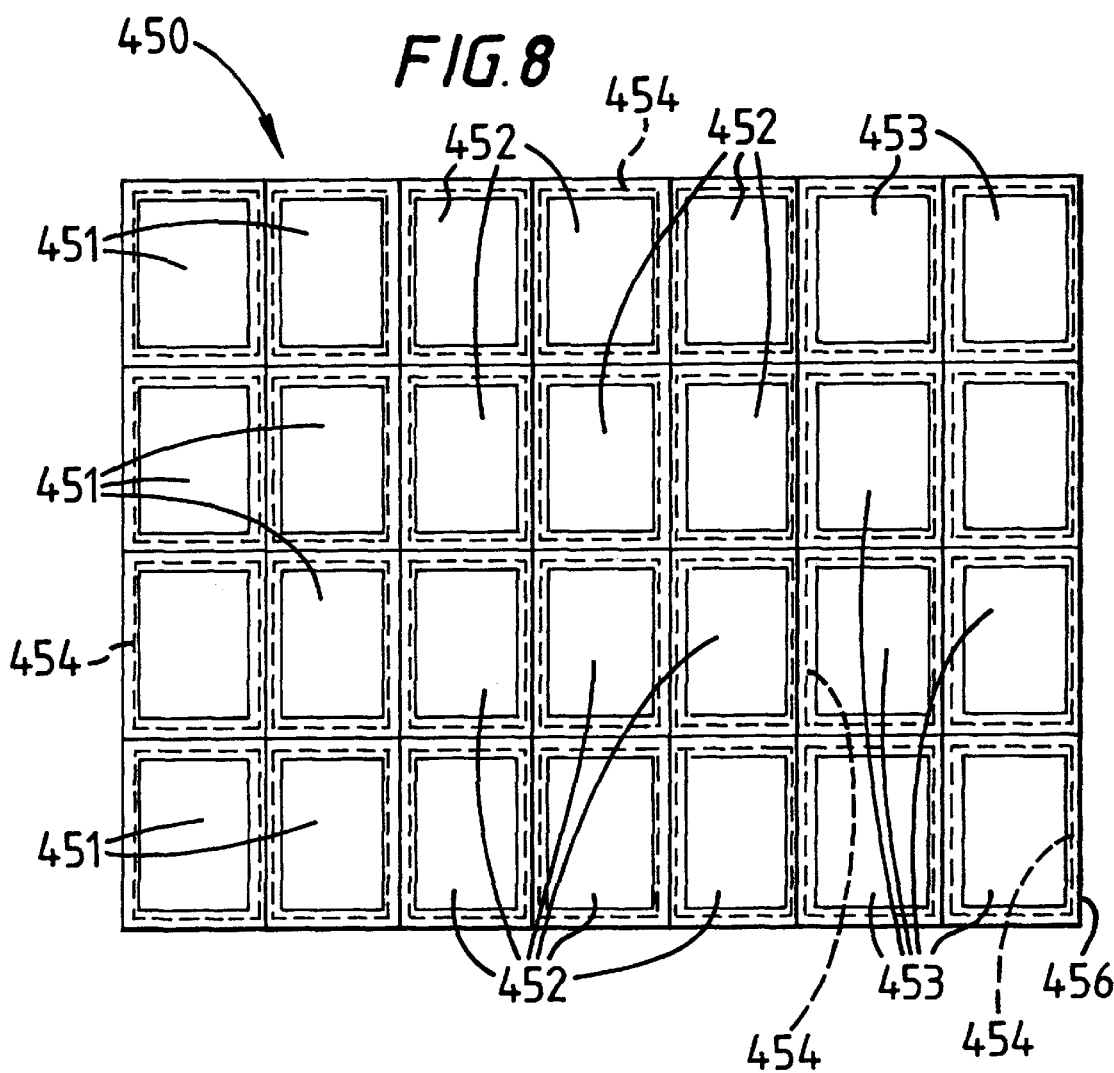

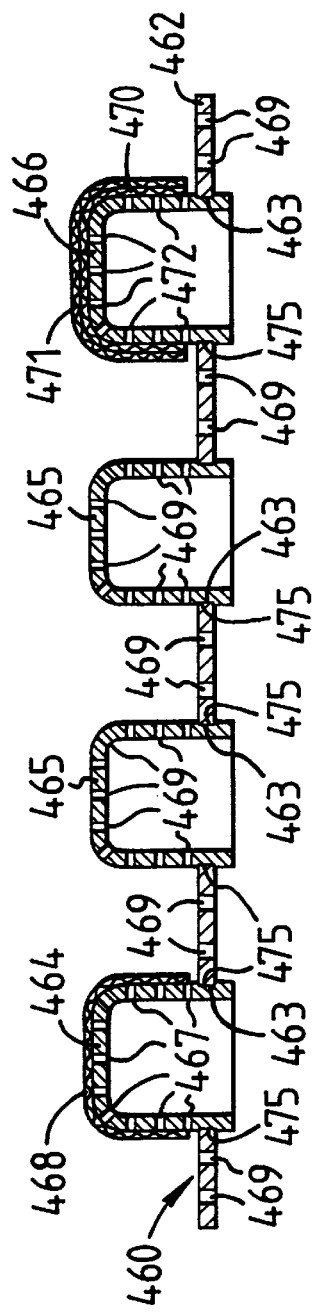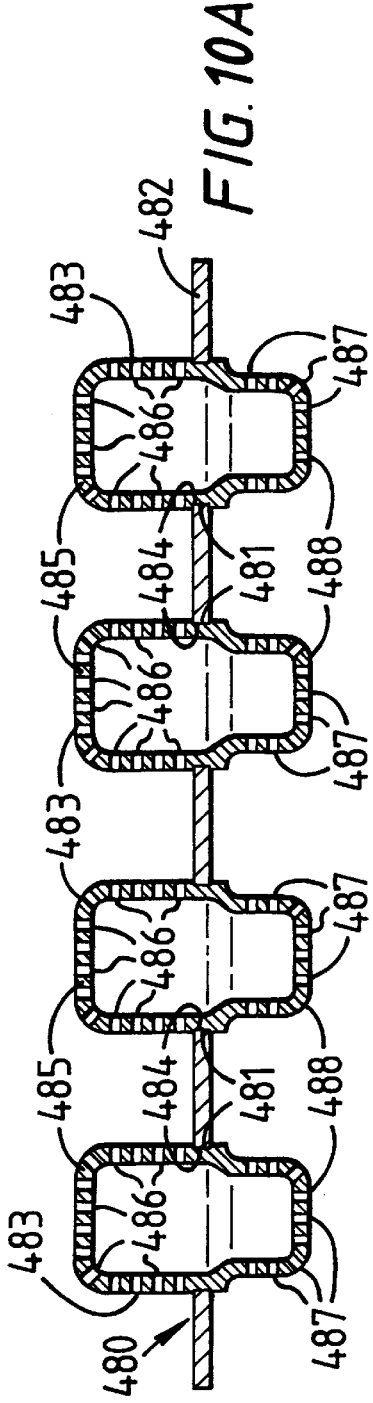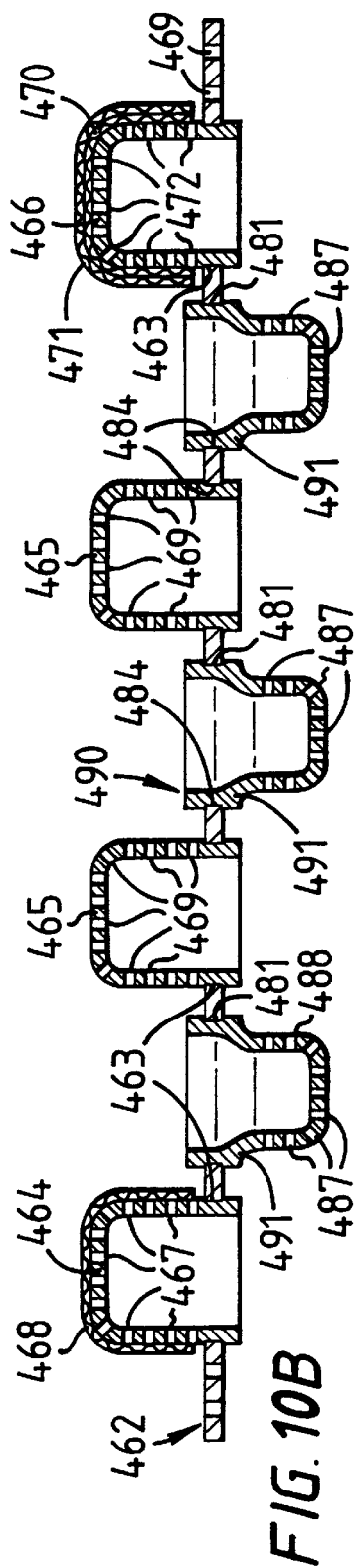

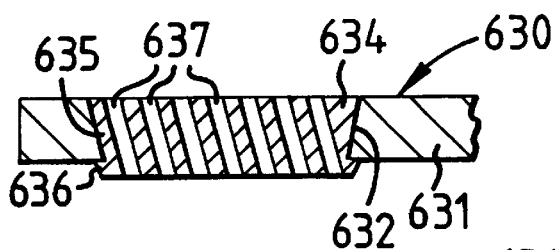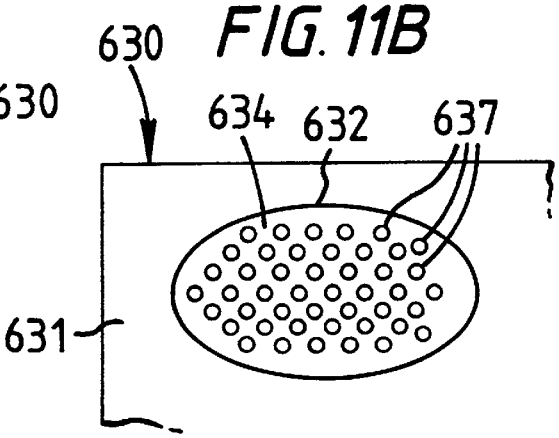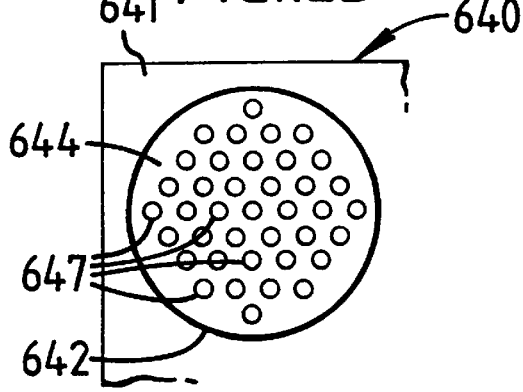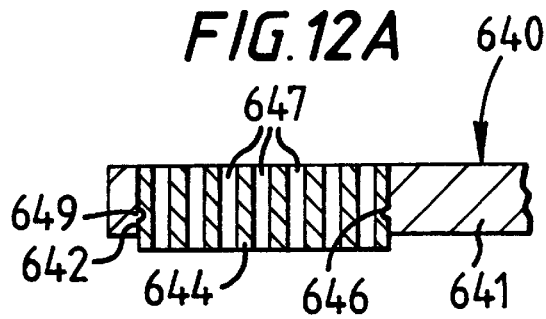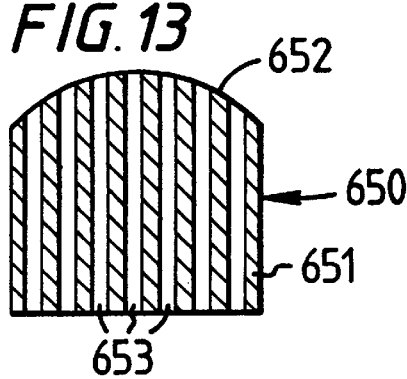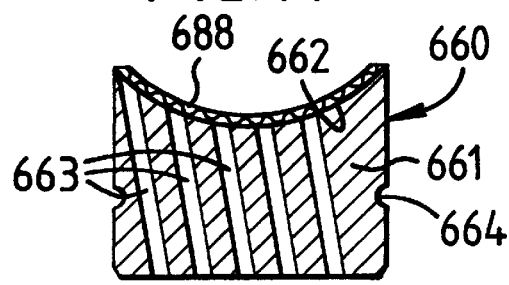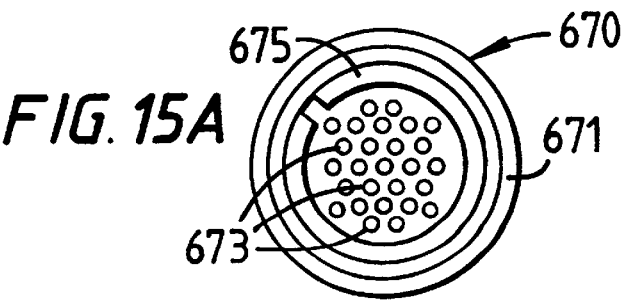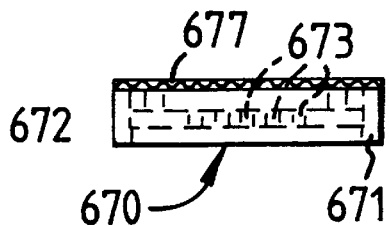

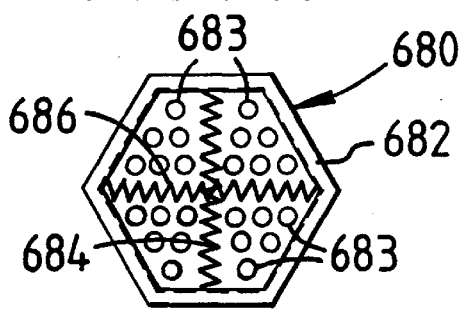
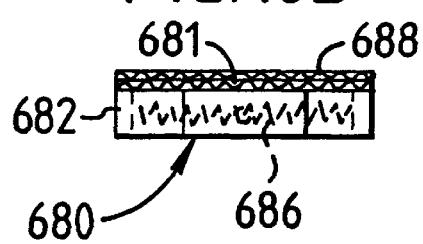
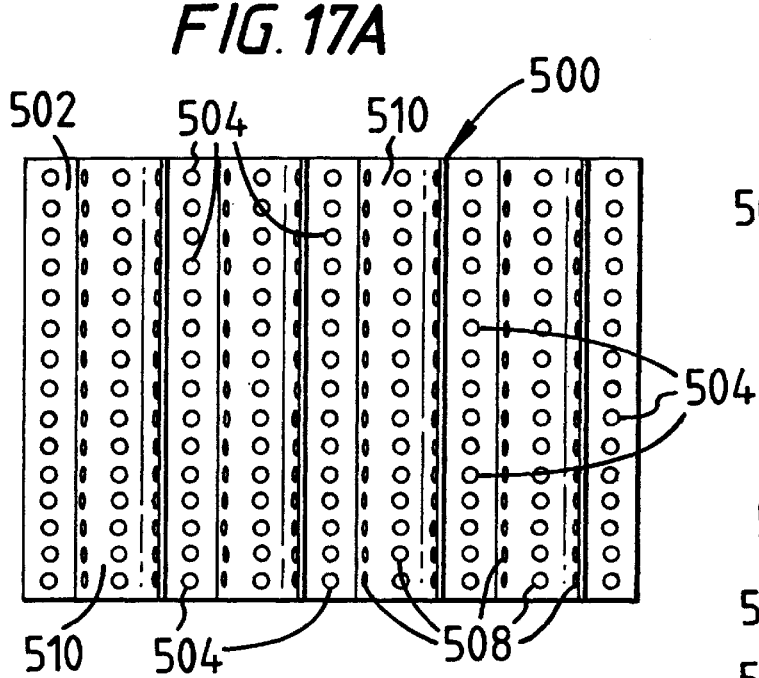
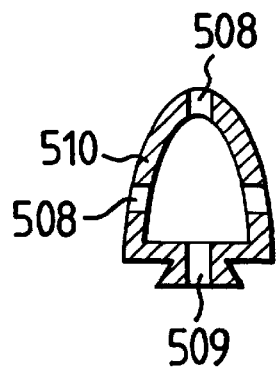
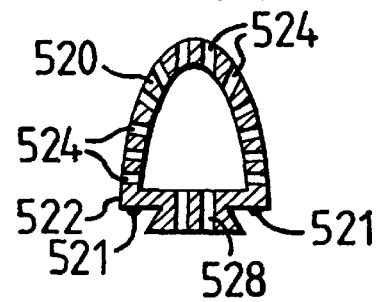
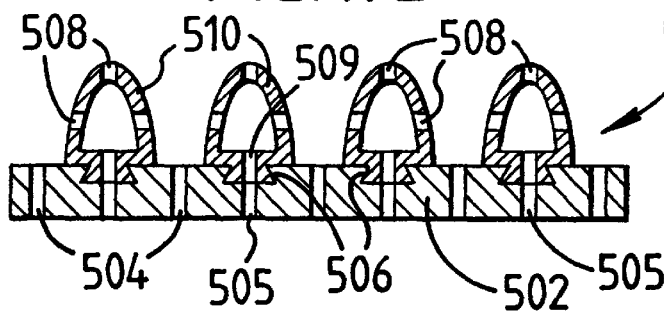
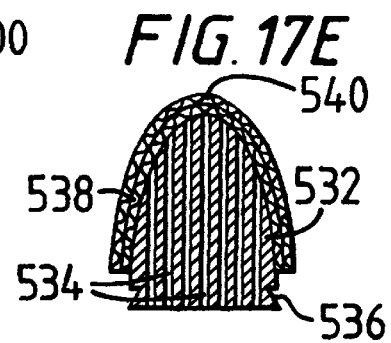

SCREEN FOR VIBRATORY SEPARATOR

This is a continuation-in-part of U.S. application Ser. No. 08/786,515 filed Jan. 21, 1997 entitled "Screen For Shale Shaker" and of U.S. application Ser. No. 08/598,566 filed Feb. 12, 1996 entitled "Screen For Vibrating Separator," both co-owned with the present invention.

BACKGROUND OF THE INVENTION

1. Field Of The Invention

The present invention is directed to screens for vibratory shakers, screens for classifying and/or filtering material, modular screens with individual screen modules or plugs, plugs for openings in screens, plugs with screening material thereon and holes therethrough, screen useful for both dewatering and classification, and methods of screen repair and assembly.

2. Description of Related Art

The related art section of each of the above-identified applications is incorporated here fully by reference.

SUMMARY OF THE PRESENT INVENTION

The present invention, in certain embodiments, discloses a screen for a vibratory shaker for screening material flowing thereto, the screen having a frame with a plurality of spaced-apart frame openings, and a plurality of screen modules (or in other aspects, plugs) each disposed in a frame opening, each screen module having a module body with a module opening and screen means (e.g. mesh, screen, openings therethrough, etc.) at the module opening for screening material flowing thereto; such a screen wherein at least one or all screen modules is removably disposed in its respective frame opening; such a screen wherein the frame has exterior sides defining a frame space within the frame and wherein the plurality of frame openings extend substantially all across the frame space; such a screen wherein the frame is substantially flat or is corrugated; such a screen wherein the screening means is screening material (e.g. any mesh, screen or combination thereof) disposed over or in or over and in the module opening; such a screen wherein the frame has holding means and the screen modules have releasable attachment means (e.g. but not limited to a recess on one member and a bead on the other) that cooperate with the holding means to releasably mount the screen modules in the frame; such a screen wherein the frame is substantially flat with a top surface and at least one screen module (or all the modules) has a screening portion that projects above the top surface of the frame; such a screen wherein the frame has a bottom and at least one screen module (or all of them) has a screening portion that projects below the bottom surface; such a screen wherein there are projecting plug portions or module portions both above and below a frame, plate or panel and, in one aspect, holes or openings through the frame, plate or panel; such a screen wherein the plurality of screen modules includes a first set of screen modules and a second set of screen modules, the first set of screen modules having screening means having a first mesh (or screen) of a first mesh (or screen) size, and the second set of screen modules having screening means having a second mesh (or screen) of a second mesh (or screen) size, the first mesh size different from the second mesh size; such a screen wherein the first set of screen modules are for dewatering the material flowing to the vibratory shaker and the second set of screen modules are for classifying the material; such a screen wherein the screening means is removably secured to the screen modules; such a screen wherein the screening means comprises a series of openings extending through the module bodies; such a screen wherein each module body has a threaded end extendable through its respective frame opening and the screen includes a threaded nut for each screen module for mating with the threaded end of the module body to secure the screen modules in their frame openings; such a screen wherein the frame has a frame top surface and each screen module has a top surface which does not project above the frame top surface; such a screen wherein the frame (plate, panel, etc.) is corrugated including periodic raised portions and a plurality of support strips underlie and are attached to the frame, each support strip having a support body having spaced-apart ends spaced-apart sides, and a top surface, and at least one upturned finger projecting above the top surface of the support body, the at least one upturned finger configured and sized for contacting and supporting at least a part of a raised portion of the frame; such a screen wherein the at least one upturned finger is a plurality of spaced-apart upturned fingers; such a screen wherein the at least one upturned finger has a curved top with a shape corresponding to a shape of a raised portion of the frame; such a screen wherein the at least one upturned finger extends up from cuts (e.g. cuts in a plastic or metal strip disposed so that upon bending the finger(s) is created) in the support body and the at least one upturned finger is integral with the support body.

The present invention discloses, in certain embodiments a screen for a vibratory shaker for screening material flowing thereto, the screen having a frame with a plurality of spaced-apart frame openings, a plurality of screen modules (or in other aspects, plugs) each disposed in a frame opening, each screen module having a module body with a module opening and screen means at the module opening for screening material (e.g. fluid, slurries, drilling mud, etc.) flowing thereto, wherein all the screen modules are removably disposed in their respective frame openings, wherein the frame has exterior sides defining a frame space within the frame and cross members which with the exterior sides define the frame openings and wherein the plurality of frame openings extend substantially all across the frame space, wherein the frame has holding means and the screen modules have releasable attachment means that cooperate with the holding means to releasably mount the screen modules in the frame, and wherein the plurality of screen modules includes a first set of screen modules and a second set of screen modules, the first set of screen modules having screening means having a first mesh of a first mesh size, or the module body having openings therethrough of a first size, or both, and the second set of screen modules having screening means having a second mesh of a second mesh size, or the module bodies having openings of a second size, or both, the first mesh size (or first opening size) different from the second mesh size (or second opening size);

The present invention discloses, in certain embodiments, a frame for a screen for a vibratory shaker, the frame having a body with sides and cross members defining a plurality of openings (or a plate or panel with such openings) for mounting therein in each opening a screen module, mounting means for securing the screen modules in the openings; and such a frame wherein the mounting means include release means for releasably mounting each screen module in its respective opening.

The present invention discloses, in certain embodiments, a support strip for supporting part of a screen used in a vibratory shaker, the support strip having a support body having spaced-apart ends spaced-apart sides, and a top surface, and at least one upturned finger projecting above the top surface of the support body, the at least one upturned finger configured and sized for contacting and supporting at least a part of a raised portion of the frame; such a support strip wherein the at least one upturned finger is a plurality of spaced-apart upturned fingers; such a support strip wherein the at least one upturned finger has a curved top with a shape corresponding to a shape of a raised portion of the frame; and such a support strip wherein the at least one upturned finger extends up from cuts in the support body and the at least one upturned finger is integral with the support body.

The present invention, in certain embodiments, discloses a plug (or module) for disposition in an opening of a plug (or module) positioning member of a screen assembly for a vibratory separator that receives fluid with material therein for separation therefrom, the plug (or module) havding a body, an opening through the body through which fluid is flowable, and screening apparatus at the opening for screening the fluid with material therein; such a plug or module wherein the screening apparatus is a series of holes through the body; such a plug or module wherein the screening apparatus is at least one, two, three or more layers of mesh and/or screen material used with or without a series of holes through the body, the layers of the same or different mesh or opening size; such a plug or module with holding apparatus on the body for securing the plug to the screen assembly; such a plug or module with releasable holding apparatus for releasably securing the plug to the screen assembly; such a plug or module with a top surface and sized and configured so that the top surface will not project above a top surface of the screen assembly, frame, plate, or panel; such a plug or module wherein the screening apparatus is releasably secured to the body; such a plug or module wherein the plug or module has a length and a width and the screen assembly has a length and a width and the opening in the plug or module positioning member (e.g. frame, plate, panel) has a length, and wherein the length of the plug is substantially equal to the length of the opening and the opening extends for substantially the length of the plug or module positioning member; such a plug or module wherein the plug or module positioning member is selected from the group consisting of a frame, a plate, and a panel and wherein the screening apparatus includes screening material; and such a plug or module with a curved, convex, concave, slanted, or horizontal top on the body.

It is, therefore, an object of at least certain preferred embodiments of the present invention to provide:

New, useful, unique, efficient, nonobvious: screens and vibratory devices with such screens;, plugs and modules for screens for vibratory separators, in one aspect releasably secured to the screen; three-dimensional screens formed with a flat plate, frame, or panel and a plurality of plugs or modules that project beyond the frame, etc. either above, below, or both; screen or frame, panel, or plate, support strips that have one or more upturened fingers fromed by cutting the strip member and bending the finger therefrom; and screens with at least dual screening areas, e.g. an area for dewatering and an area for classifying and/or an area for high wear and replaceable modules or plugs with appropriate screening and/or mesh material to effect this; screens that are easily repairable or have areas that are easily replaced; and such screens that are flat or corrugated.

The present invention, in certain embodiments, discloses a method for making a plate mesh combination, the method including securing (e.g., but not limited to, with adhesive and/or heat) at least one, two, three or more meshes and/or screens to a plate, heating the plate, and corrugating the plate with the mesh and/or screen thereon while it remains heated.

Certain embodiments of this invention are not limited to any particular individual feature disclosed here, but include combinations of them distinguished from the prior art in their structures and functions. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods.

The present invention recognizes and addresses the previously-mentioned problems and long-felt needs and provides a solution to those problems and a satisfactory meeting of those needs. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1A is a top view of a screen plug according to the present invention. FIG. 1B is a side view of an embodiment of a plug as in FIG. 1A. FIG. 1C is a side view of an embodiment of a plug as in FIG. 1A.

FIG. 2A is a top view of a screen plug according to the present invention. FIG. 2B is a cross-section view along line 2B—2B of FIG. 2A. FIG. 2C is a side view of an embodiment of a plug as in FIG. 2A. FIG. 2D is a side view of an embodiment of a plug as in FIG. 2A.

FIG. 3A is a top view of a screen plug according to the present invention. FIG. 3B is a cross-section view along line 3B—3B of FIG. 3A. FIG. 3C is a side view of an embodiment of a plug as in FIG. 3A. FIG. 3D is a side view of an embodiment of a plug as in FIG. 3A. FIG. 3E is a side view of an embodiment of a plug as in FIG. 3A. FIG. 3F is a side view in cross-section of a fastener for the plug of FIG. 3F.

FIG. 4B is an end view of the screen of FIG. 4A.

FIG. 5A is a top view of a screen according to the present invention. FIG. 5B is an end view of the screen of FIG. 5A.

FIG. 6A is a perspective view of a strip support according to the present invention. FIG. 6B is an end view of the strip support of FIG. 6B. FIG. 6C is a top view of the strip support of FIG. 6A.

FIG. 7A is a top view of a strip support according to the present invention. FIG. 7B is a perspective view of the strip support of FIG. 7A. FIG. 7C is an end view of the strip support of FIG. 7B.

FIG. 8 is a top schematic view of a screen assembly according to the present invention.

FIG. 9 is a side cross-section view of a screen assembly according to the present invention.

FIG. 10A is a side cross-section view of a screen assembly according to the present invention. FIG. 10B is a side cross-section view of a screen assembly according to the present invention.

FIG. 11A is a side cross-section view of a screen assembly according to the present invention. FIG. 11B is a top view of the screen assembly of FIG. 11A.

FIG. 12A is a side cross-section view of a screen assembly according to the present invention. FIG. 12B is a top view of the screen assembly of FIG. 12A.

FIG. 13 is a side cross-section view of a plug according to the present invention.

FIG. 14 is a side cross-section view of a plug according to the present invention.

FIG. 15A is a bottom view of a plug according to the present invention. FIG. 15B is a side view of the plug of FIG. 15A.

FIG. 16A is a bottom view of a plug according to the present invention. FIG. 16B is a side view of the plug of FIG. 15A.

FIG. 17A is a top view of a screen assembly according to the present invention. FIG. 17B is an end view of the screen assembly of FIG. 17A. FIG. 17C is an end view of an elongated plug of the screen assembly of FIG. 17A. FIGS. 17D and 17E are end views of alternative elongated plug embodiments.

DESCRIPTION OF EMBODIMENTS PREFERRED AT THE TIME OF FILING FOR THIS PATENT

Figure 4A:
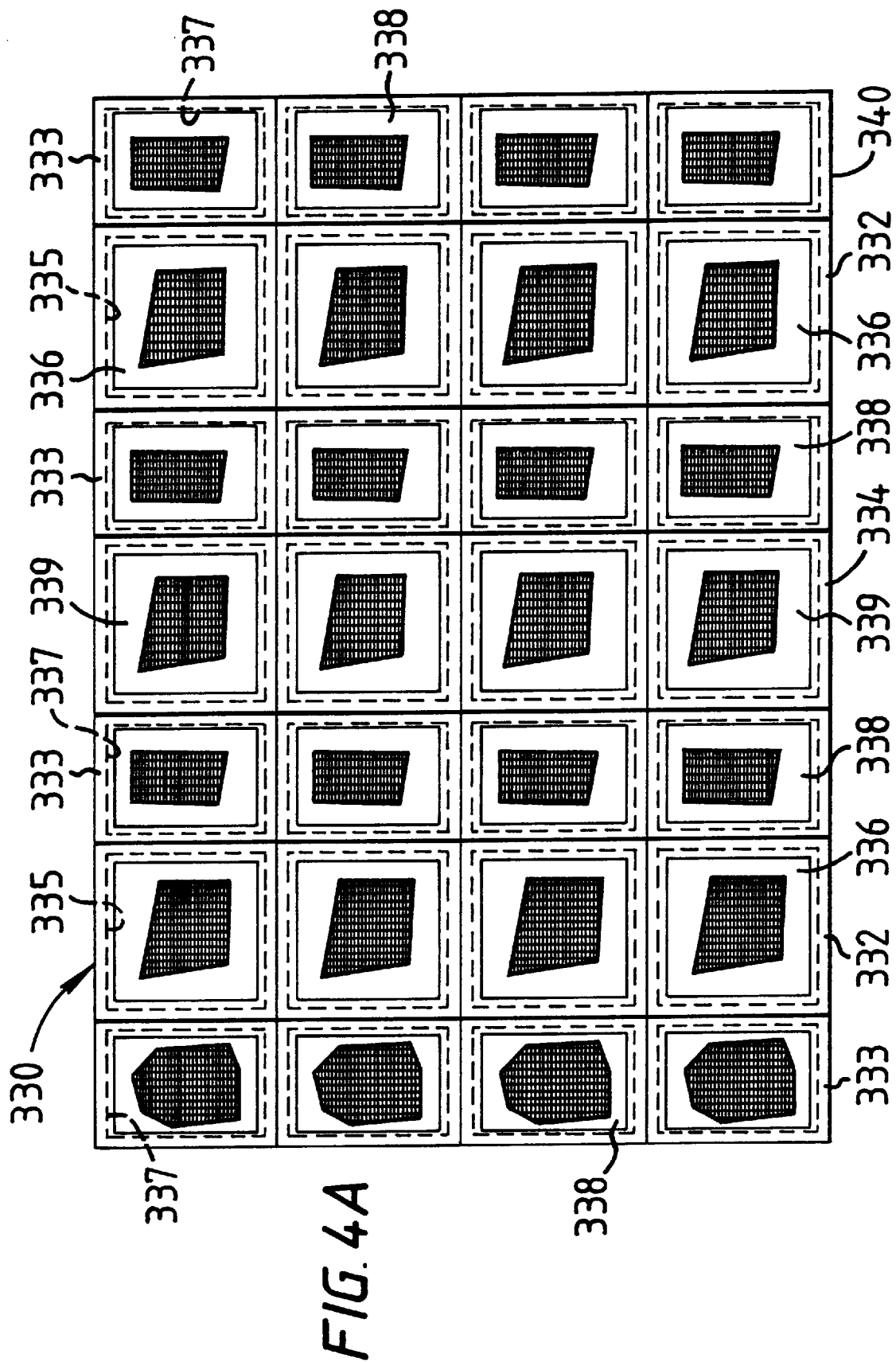
FIG. 4A is a top view of a screen according to the present invention.
Figure 18A:
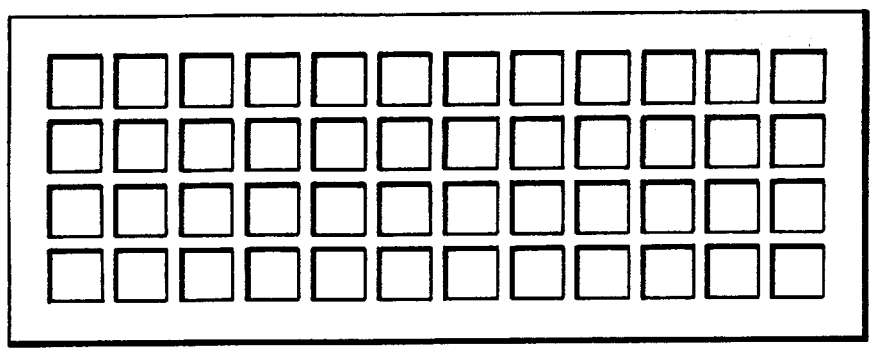
FIGS. 18A–18D are top views of prior art perforated plates.
Figure 18B:
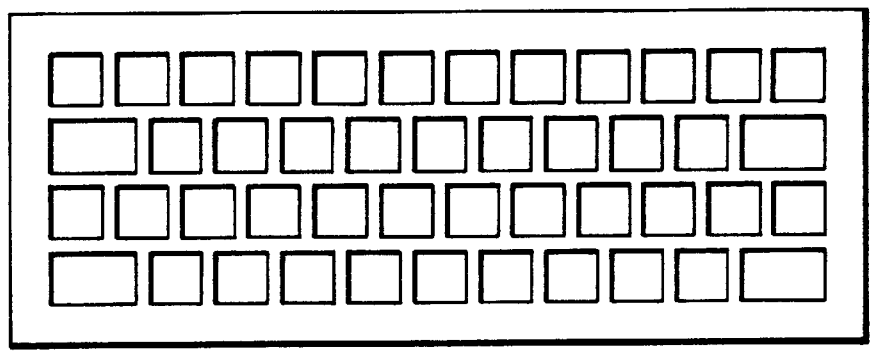
Figure 18C:
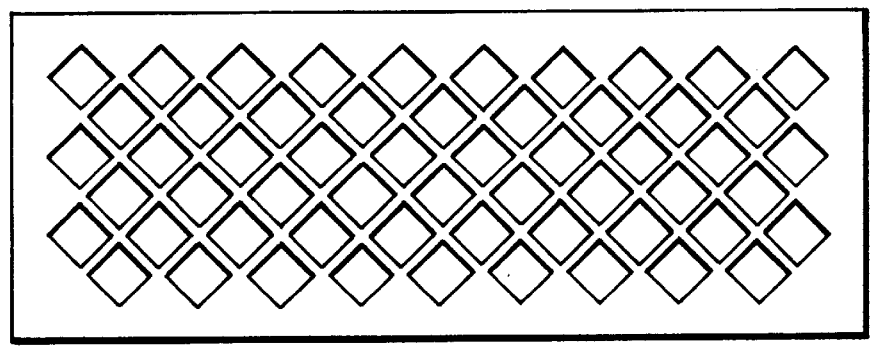
Figure 18D:
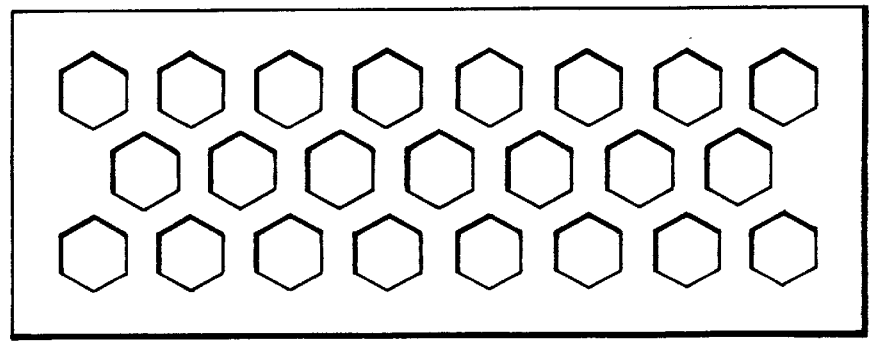

As shown in FIG. 1A, a plug 160 according to the present invention has a body 161 and a mesh 162 formed integrally thereof. It is within the scope of this invention for the mesh to be a wire mesh or meshes (or screens) secured to the body 161 or wire mesh over the integral mesh 162. In certain aspects the plug 160 is a single piece member made of plastic or urethane.

In the embodiment of FIG. 1B, the plug 160 has an upper member 163 spaced apart from a lower member 164 by a snap recess 165 which is sized to correspond to an edge of a screen opening so that the plug 160 may be snapped into and then held in the screen opening.

In the embodiment of the plug 160 in FIG. 1C, an upper member 166 is disposed above a lower member 167. The lower member 167 is sized to fit in an opening of a screen. The plug 160 may be held in place in a screen opening by a friction fit and/or with a suitable glue, adhesive, or epoxy. Velcro™ material at plug edges and on opening edges may be used to releasably secure any plug herein at or in an opening. Plugs of different screening material or mesh or mesh size may be used in different screen areas; e.g., but not limited to plugs with a 40 mesh at back edge of a screen and plugs with a 100 mesh at a front end of the screen.

As shown in FIGS. 2A, 2B and 2C, a plug 170 according to the present invention has a body 171 and a mesh 172 formed integrally thereof. It is within the scope of this invention for the mesh to be any known mesh or screen, meshes or screens, or combination thereof, including but not limited to a layer or layers of plastic or synthetic mesh or a piece or pieces of perforated plastic or synthetics (bonded together, unbonded, or bonded at intermittent points) or a wire mesh secured to the body 171. In certain aspects the plug 170 is a single piece member made of plastic or urethane.

In the embodiment of FIG. 2A, the plug 170 has an upper member 173 spaced apart from a lower member 174 by a snap recess 175 which is sized to correspond to an edge of a screen opening so that the plug 170 may be snapped into and then held in the screen opening.

In the embodiment of the plug 170 in FIG. 2D, an upper member 176 is disposed above a lower member 177. The lower member 177 is sized to fit in an opening of a screen. The plug 170 may be held in place in a screen opening by a friction fit and/or with a suitable glue, adhesive, or epoxy.

As shown in FIGS. 3A, 3B and 3C, a plug 180 according to the present invention has a body 181 and a mesh 182 formed integrally thereof. It is within the scope of this invention for the mesh to be a wire mesh secured to the body 181. In certain aspects the plug 180 is a single piece member made of plastic or urethane.

In the embodiment of FIG. 3A, the plug 180 has an upper member 183 spaced apart from a lower member 184 by a snap recess 185 which is sized to correspond to an edge of a screen opening so that the plug 180 may be snapped into and then held in the screen opening.

In the embodiment of the plug 180 in FIG. 3D, an upper member 186 is disposed above a lower member 187. The lower member 187 is sized to fit in an opening of a screen. The plug 180 may be held in place in a screen opening by a friction fit and/or with a suitable glue, adhesive, or epoxy.

FIG. 3E shows an embodiment of the plug 180 with an upper body 188 and a lower body 189 with threads 190 thereon. A fastener 191 (FIG. 3F) with internal threads 192 threadedly mates with the lower body 189 to removably attach the plug 180 in a screen opening. Internal threads may be used on the plug 180 with an externally threaded fastener.

FIG. 4A shows a screen 330 according to the present invention with a plurality of ridges with ridge tops 332 connected to ridge sides 333 with bottom member 334 between adjacent ridge sides 333. The ridge tops 332 have a plurality of openings 335 each with a plug 336 therein according to the present invention. The ridge sides 333 have a plurality of openings 337 each with a plug 338 therein according to the present invention. The bottom member 334 has one or a plurality of at least two or more openings each with a plug 339 therein according to the present invention. A plate 340 has the ridge tops 332, ridge sides 333 and bottom members 334, each with their respective openings. It is within the scope of this invention for some or substantially all (e.g. the total minus one, two, three, four, five, or up to twenty) of the openings in the plate 340 to be covered with screen, screens, mesh or meshes in any combination applied and secured in any known manner or in any manner disclosed herein. It is within the scope of this invention for any opening in the plate 340 to have a plug permanently or removably disposed therein or for such a plug to be emplaced in any opening to repair damaged screen or to replace a previously used plug. Any plug disclosed herein may be used with the screen 330. The plugs 342 are like the plugs of FIGS. 1C, 2D, 3D or 3E. It is within the scope of this invention for the screen 330 to have any number of desired ridges 332 of any suitable dimensions with corresponding ridge sides 333 and bottom members 334, or with interconnected ridges having no bottom member therebetween. Alternatively, pointed corrugations may be used with no flat top and no flat bottom or with a flat bottom and pointed top. Such a screen (and any screen or screen assembly disclosed herein) may be used on a frame; on a flat perforated plate; on one or more braces and/or strip supports (flat and/or corrugated; and corrugated to correspond to the shape of the screen 330's shapes); on a combination thereof; and/or with upturned side edges or other connection apparatus for connection to a vibratory separator or shale shaker.

It is within the scope of this invention for the plugs of FIGS. 2A–2D and 3A–3E (and any plug disclosed herein) to be circular, oval, or square, rectangular, triangular, regular polygonal, polygonal elliptical (as viewed from above) or to be elongated as disclosed below. It is within the scope of this invention for mesh or meshes on or formed integrally of any plug herein (described above or below) to be oriented and emplaced on a screen either parallel to or normal to the direction of flow of material onto the screen for dewatering or classifying as desired. It is within the scope of this invention to provide a plug (described above or below) with both mesh or meshes formed integrally thereof and mesh or meshes applied thereunder or thereover. Upper plug parts may be made of plastic (or urethane) with lower parts made of metal, or vice versa. The plug body may be plastic or metal with plastic and/or wire mesh bonded to it. Different plugs may be used in the same screen. Plugs can be any desired size. In one aspect plugs range from a smallest width of about 0.5 inches to one foot wide, or more and from a length of 0.5 inches to several feet. In one aspect plugs with different mesh or screen than other plugs are used in the same screen to provide a different classification function in one screen. In one aspect plugs of uniform size with similar or dissimilar mesh or screen are used.

FIG. 5A shows a screen 350 according to the present invention with a plurality of openings 351 and 352 in a plate 360. Plugs 353 are secured in some of the openings 351 and a plug 354 is in one of the openings 352. Mesh (shown partially in FIG. 5A) covers substantially all of the tops of the plugs 353 and 354. Screen 355 covers openings that are not plugged. Screen 355 may be any known screen, screens, mesh, or meshes applied to the plate 360 in any known manner or any manner disclosed herein. The plate 360 may be any known plate, flat or corrugated.

FIG. 6A shows a support strip 370 according to the present invention with a body 371, ends 372 and upturned fingers 373, 374. In one aspect the strip 370 is metal (e.g. but not limited to carbon steel or stainless steel), and the fingers are upturned following a cut 375 in the body 371 and then a cut to separate the fingers. These cuts are made and sized, in one aspect, so that the fingers are sized and positioned to correspond to raised portions of a corrugated screen or of a corrugated plate. The strip 370 can be used as any strip disclosed herein or in pending co-owned application U.S. Ser. No. 08/786,515 filed on Jan. 21, 1997 entitled "Screen For Shale Shaker" incorporated fully herein for all purposes. Alternatively, the strip 370 can be a molded item made as shown in FIGS. 6A–6C. It is within the scope of this invention to have a strip with three, four, five or more sets of upturned fingers and, in one aspect, to have a set of fingers for each raised portion of a plate and/or screen used with the strip. It is within the scope of this invention to use any desired number of strips with a plate and/or screen. One or more sets of fingers 373, 374 may be used on a strip with one or more fingers 385 of the strip of FIG. 7A.

FIGS. 7A–7C disclose a support strip 380 for a screen and/or plate which has a body 381 (in one aspect made of metal) with ends 382 and a cut 383 which has fingers 385. As shown in FIGS. 7B and 7C, the fingers 385 are upturned and have a top curved portion 384. In one aspect the top curved portion 384 corresponds in shape to a curved portion of a corrugated plate and/or screen used with one or more of the strips 380. Alternatively the strip 380 can be made of one integral plastic piece. Any desired number of fingers 385 may be provided.

The present invention discloses a method for making a screen assembly in which a perforated plate is sandblasted and/or washed with any suitable degreaser and/or soap. Any suitable perforated plate may be used. In one particular embodiment the perforated plate has round holes about ¼ inch in diameter or square holes with a diagonal measurement of about ¼ inch which have centers that are about 0.030 inches apart and that are separated from each other by about 0.050 inches of plate. Alternatively holes with a ⅜ inch, or ½ inch diameter may be used. The plate, in certain aspects, is made of carbon steel, stainless steel, or plastic. The holes, in one aspect, are at a 45° angle to the direction of fluid flow across the plate. If desired, the plate can be sandblasted or sanded.

The plate is heated to about 450° F. (in an oven or heat press) and is then dipped, preferably while positioned horizontally, into a fluidized bed of epoxy, (or other suitable adhesive) to coat the plate with melted epoxy powder in the bed. Heat in the plate permits the epoxy powder to bond to it in a semi-cured state. In another aspect powdered nylon, (or powdered polyester, or any suitable powderized coating) is coated onto the plate using a fluidized bed. In one aspect the epoxy is about 15 to 30 mils thick and in another aspect is about 20 mils thick on top of the plate and about 5 mils thick on the sides and bottom.

One, two, three, four or more layers of wire mesh are then cut to cover the pattern of perforations on the screen plate (in one aspect wider and longer than the coated screen plate), in one aspect mesh of 2 mesh to 500 mesh. The wire mesh and screen plate are placed on top of a non-stick panel (e.g. a panel made of 20 gauge steel with a Teflon(™) coating is applied to the panel; alternatively a 20 gauge steel sheet with a 20 mil thick sheet of Teflon(™) material on it may be used). The now non-stick panel acts as a tray for sliding the plate/mesh combination into an oven and the panel prevents the screen plate coating from sticking to the oven. Due to the Teflon(™) coating the plate surface adjacent to the wire mesh, the screen plate and wire mesh do not bond to the panel. The screen plate, alternatively, may be placed on top of the mesh or meshes. A second non-stick panel is then placed over the first plate/mesh/panel combination. This second panel non-sticking surface is adjacent to the plate. In one aspect this second panel has a sheet of self-adhesive Teflon(™) material on its lower side facing the mesh on the plate. Instead of Teflon(™) material, any material may be used which will prevent the epoxy (nylon, polyester, etc.) from sticking to the panels. The two panels may be fastened together to provide pressure to facilitate encapsulation of the mesh by molten epoxy.

The sandwich of panels, plate, and mesh is placed in an oven, e.g. for 6 to 8 minutes at 340° F. to cure the epoxy. The cured screen plate is removed from the oven and the mesh and epoxy are cut flush with the sides of the screen plate. It is known in the art to thus prepare a plate/mesh combination. However, the inventors are unaware of any prior art teaching: the re-introduction of the plate/mesh back into an oven; the re-heating of the plate/mesh; or corrugating a re-heated combination of plate/mesh.

The plate with the mesh may then be corrugated or, alternatively, it is first placed back in the oven for about 2 minutes at about 450° F. While still hot, the plate is removed from the oven and corrugated (e.g. using a press brake). In one aspect a plate about 36 inches wide and about 47 inches long after corrugations has corrugations with ridges that are about an inch high. In one preferred embodiment the plate with the mesh and cured epoxy is at a temperature of at least about 250° F. until the corrugating operation is finished. With more flexible cured materials, e.g. nylon, it is not critical to maintain the relatively high temperature level of the plate during the corrugation operation. Alternatively, the plate is not corrugated.

The resulting screen assembly may be attached to a frame or it may be provided with upturned opposed edges for connection to a separator or shaker. In one aspect Velcro(™) material on the screen assembly is used with mating Velcro (™) material on a frame or on a separator or shaker to releasably attach the screen assembly thereto. In another aspect the screen assembly is thus connected to one or more support strips (e.g. but not limited to, any support strip described herein).

In one aspect such a screen assembly is placed on a frame coated with epoxy and the two items are held together between Teflon(™) material sheets. This combination is then cooked at about 450° F. for about 8 to 15 minutes to cure the epoxy and secure the screen assembly to the frame.

In one aspect a corrugated screen assembly as described above has the spaces below ridges capped or plugged at each end of the screen assembly.

FIG. 8 shows schematically a screen 450 with a plurality of screening plugs or modules 451, 452, 453 that are removably secured in corresponding openings 454 in a plate 456. Each module may be any size. With modules larger than those shown (e.g. up to a largest dimension of 6, 8, 12 or more inches or several feet; and in one aspect a screen with relatively few modules e.g. as in FIG. 8) there are fewer modules over the plate surface and with smaller modules (e.g. down to a largest dimension of about ½ inch) there are more modules over the plate surface. In one aspect the modules 451 have a relatively coarse metal mesh, e.g. 150 mesh screen; the modules 452 have a coarser mesh, e.g. 80 mesh; and the modules 453 have a fine mesh, e.g. 200 mesh, with the flow of fluid to be treated from the fine to the coarse modules (right to left in FIG. 8A). Alternatively this pattern can be reversed; all the modules may have a substantially similar mesh; or any and all modules may have a combination of meshes thereon, including screens in layers of different mesh and/or screens or meshes made of different material, e.g. but not limited to carbon steel, stainless steel, Teflon(™) material, plastic, and/or urethane.

It is within the scope of this invention to provide any plug or module disclosed herein initially with no holes, perforations, or openings therethrough and then, e.g. later at a job site, to perforate the plug or module with the desired number and desired size openings, holes, or perforations or combination thereof. Such openings (and holes or openings for any plug or module disclosed herein) may be normal to the direction of the flow of fluid flowing above the hole, etc. (e.g. for classification) or at an angle other than perpendicular to such direction of flow (e.g. for dewatering to remove a large, preferably maximum, amount of liquid from a product).

With respect to the screen of FIG. 8 (or any other screen disclosed herein) it is within the scope of this invention for any plug or module, or any group thereof, to be fashioned for dewatering and/or for classification. A single screen may, therefore, have an area primarily for dewatering a product flowing thereacross and an area for classifying component materials of the product. Plugs and modules disclosed herein may be made of metal, plastic, fiberglass, cermet, urethane, KYNAR, polymeric material, BUNA N, Teflon(™) material, or polyvinylidene fluoride. In one aspect a screen is provided with plugs or modules made of urethane (or similar material) for a high wear area (e.g. at an area of the initial introduction of a slurry to a first screen, the area which first encounters fluid and/or product to be treated); and a lower wear area with plugs or modules with metal wire mesh.

Square plugs or similar plugs fitted with woven mesh (e.g. rectangular woven mesh) can be fitted to provide a screen for classifying or dewatering. With rectangular openings, in one aspect flow parallel to a long opening is used for dewatering and flow perpendicular to a long opening is used for classification.

FIG. 9 shows a screen assembly 460 with a plate 462 having holes 463 therethrough. A plug 464, 465, or 466 is removably secured in each hole 463. The plugs convert the plate into a 3-D corrugated screen assembly. It is within the scope of this invention for the plugs to have any desired shape and size to make a screen assembly with ridges of any shape and size—the ridges being part of the plugs. The plugs may be discrete separate items with a plurality of them spaced apart or they may be elongated members, e.g. two, four, twelve, twenty four, thirty, thirty six or more inches long and one, two, three, four or more inches wide.

The plug 464 has openings 467. Any number of openings of any desired size may be used. A mesh 468 covers the exposed surface of the plug 464. The plate 462 has optional openings 469 (any desired number and in any desired pattern) which may be sized for dewatering, separation, or classifying.

The plugs 465 have openings 469 and have no mesh thereon. The plug 466 has two mesh layers 470 and 471 and holes 472. Any combination of any mesh made of any material may be used on the plugs 464, 465, 466. Grooves 475 permit the plugs to be snapped into the holes 463. Alternatively the plugs can be permanently or semi-permanently bonded to the plate. Failed or damaged plugs may be replaced with little or no loss of screening area.

FIG. 10A shows a screen assembly 480 according to the present invention with a plate 482 having holes 481 therethrough and thereacross. A groove 484 permits plugs 485 to be snapped into the holes 481. A top perforated plug body 483 projects above the plate surface and a bottom perforated plug body 488 projects below the plate surface. Perforations 486 in the top perforated plug body may be similar to or different from perforations 487 in the bottom perforated plug body in size and disposition and they may be angled differently. Top and bottom plug bodies may be made of similar or different material and they may have one or more meshes (metal or otherwise thereon). As with the plugs of FIG. 9 and others disclosed herein, the plugs 485 may be any desired size, length, width, and cross-sectional shape.

FIG. 10B shows a screen assembly 490 with plugs as in FIG. 9 above a top surface of the plate 462 and bottom plug bodies like those of the plugs 485 (FIG. 10A). Holders 491 hold the bottom plug bodies on the plate 462. The holders 491 use the grooves 484 as is shown in FIG. 10A. The sections of the plate 462 between plugs may have holes or openings therethrough. The holes 463 in the plate 462 may be sized and configured as any opening or hole disclosed herein, including but not limited to an array of adjacent holes or openings (square, hexagonal, circular, triangular, rectangular) extending across the entire surface of the plate 462 or a series of relatively long openings extending from one side of a square or rectangular plate 462 to the other so that a corrugated screen is formed with both upper and lower corrugated surfaces defined by the plugs, the plugs extending for substantially the whole length of the relatively long openings.

FIGS. 11A and 11B show a screen assembly 630 according to the present invention with a plate 631 (shown partially) having a plurality of openings 632 thereacross. The openings 632 may initially be covered by one or more meshes and/or screens (as with all plates disclosed herein) or, alternatively all the openings 632 may have a plug 634 therein (as with all plates disclosed herein). Also, a plug 634 may be used to repair damaged mesh/screen over an opening with little or no loss of screening area. The plug 634 has a tapered body 635 corresponding to a tapered surface of the openings 632 and a lower lip 636 that permits the plug to be snapped into the openings 632 and held in the openings 632. The plug 634 has holes 637 extending therethrough. Alternatively the plugs 634 may be solid or may have more or less holes of larger or smaller diameter than those shown. The plug 634 as shown in FIG. 11B is elliptical as viewed from above; however it is within the scope of this invention to use any suitable shape, including but not limited to square, circular, triangular, hexagonal, polygonal, regular polygonal or rectangular. Also, a mesh, meshes, screen, and/or screens may be applied on the top surface of the plugs 634. It is critical for certain particular embodiments of the screen assembly 630 that the top surface of the plugs 634 is substantially flush with the top surface of the plate 631 (or with mesh etc. on top of the plate). Materials disclosed herein may be used for the plugs and plate.

FIGS. 12A and 12B show a screen assembly 640 according to the present invention with a plate 641 (shown partially) having a plurality of openings 642 thereacross. The openings 642 may initially be covered by one or more meshes and/or screens (as with all plates disclosed herein) or, alternatively all the openings 642 may have a plug 644 therein (as with all plates disclosed herein). Also, a plug 644 may be used to repair damaged mesh/screen over an opening. The plug 644 has a body 645 and a groove 646 that permits the plug to be snapped into the openings 642 and a bead 649 on the plate 641 to enter into the groove 646 to hold the plugs 644. The plug 644 has holes 647 extending therethrough. Alternatively the plugs 644 may be solid or may have more or less holes of larger or smaller diameter than those shown. The plug 644 as shown in FIG. 12B is circular as viewed from above; however it is within the scope of this invention to use any suitable shape, including but not limited to square, circular, elliptical, hexagonal, polygonal, regular polygonal, triangular, or rectangular. Also, a mesh, meshes screen, and/or screens may be applied on the top surface of the plugs 644. It is critical for certain particular embodiments of the screen assembly 640 that the top surface of the plugs 644 is substantially flush with the top surface of the plate 641 (or with mesh etc. on top of the plate). Materials disclosed herein may be used for the plugs and plate.

FIG. 13 shows a plug 650 according to the present invention with a body 651 and a top convex surface 652. A series of holes 653 extend through the plug 650. The plug 650 may be any desired size or shape.

FIG. 14 shows a plug 660 according to the present invention with a body 661, a top convex surface 662, and a mesh 668 thereon. A series of holes 663 extend through the plug 660. The plug 660 may be any desired size or shape. The holes 653 (FIG. 13) and holes 663 (FIG. 14) may be any diameter and there may be any desired number of them.

FIGS. 15A and 15B show a plug 670 according to the present invention with a body 671 and a series of holes 673 extend therethrough. The plug 670 may be any desired size or shape. The plug 670 is made of flexible material and has an expansion ring 675 therein that pushes the plug sides outwardly to facilitate maintenance of the plug 670 in position in a plate opening and/or put the plug's mesh or meshes in tension. A mesh or screen 675 is on top of the plug 670.

FIGS. 16A and 16B show a plug 680 according to the present invention with a body 682. A series of holes 683 extend through the plug 680. The plug 680 may be any desired size or shape. The plug 680 is made of flexible material and has expansion springs 684 and 686 that push the plug sides outwardly to facilitate maintenance of the plug 680 in position in a plate opening and/or put the plug's mesh or meshes in tension. One, two, three or more springs may be used. Meshes 681 and 688 are secured on the plug 680.

FIGS. 17A and 17B show a screen assembly 500 according to the present invention with a perforated plate 502 having perforations 504 extending therethrough from top to bottom. Any number and size perforations may be employed in any desirable pattern or positioning on the plate 502. Dovetail recesses 506 extend across the plate 502. Holes 505 extend from the recesses through the plate 502. A corresponding dovetail base of an elongated hollow plug 510 is held in each dovetail recess 506. Each plug 510 has a series of perforations or holes 508 therethrough and one or more bottom holes 509. Any number and size holes may be employed in any desired pattern or positioning on the plugs 510. The plugs 510 may be held tightly in the recesses 506 with a tight friction fit and/or with welding or epoxy. In one aspect the plugs 510 are removably inserted into the dovetail recesses 506 for easy replacement and/or repair. Any hole in a plug 510 may be repaired with a plug as previously described above for repairing damaged or torn mesh or screen. The perforations 504 and/or the holes 508 may be covered with any known mesh, meshes, screen or screens, bonded or unbonded, in any combination or layers.

FIG. 17C shows one of the plugs 510.

FIG. 17D shows an alternative embodiment of an elongated hollow plug 520 according to the present invention that has a body 522, holes 524 therethrough, a base 526 with holes 528 therethrough and a dovetail portion 529 through which the holes 528 also extend. To enhance sealing of the plug/plate interface, a seal bead 521 is provided along each side of the plug along its entire length. Alternatively such a seal member may be formed of or secured to the plate with which the plug 520 is used. The seal bead or member may be plastic, rubber, or any known suitable sealing material. Such a bead may also serve to stabilize the plug in place on the plate.

FIG. 17E shows an alternative elongated solid plug 530 with a body 532 having a series of holes 534 therethrough and a dovetail base 536. A mesh or screen 538 is secured over the plug body 532 covering the plug on its top surface. Fluid to be treated flows through the screen 538 and through the holes 534. Two or more meshes and/or screens may be used.

FIGS. 18A–18D show known perforation patterns for plates used with screens which may be used with plates and/or screen assemblies according to the present invention. The direction of fluid flow on the plates of FIGS. 18A–18D may be from top to bottom (as viewed in the Figures) or side to side (as viewed in the Figures).

Pending U.S. applications Ser. Nos. 08/598,566 and 08/786,515, identified above, are incorporated herein in their entirety for all purposes.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. § 112.

What is claimed is:

1. A screen for a vibratory shaker for screening material flowing thereto, the screen comprising a frame having two pairs of spaced-apart sides and having a corrugated shape comprising a plurality of alternating ridges, each ridge with a top and ridge sides, the frame with a plurality of spaced-apart frame openings, each frame opening within and extending through the frame, each ridge top having a plurality of said frame openings spaced apart and each ridge side having a plurality of said frame openings spaced apart, a plurality of screen plugs each with at least a portion thereof disposed within a frame opening, each screen plug having a plug body with a plug opening and screen means at the plug opening for screening material flowing thereto.

2. The screen of claim 1 wherein at least one screen plug is removably disposed in its respective frame opening.

3. The screen of claim 1 wherein all the screen plugs are removably disposed in their respective frame openings.

4. The screen of claim 1 wherein the frame has exterior sides defining a frame space within the frame and wherein the plurality of frame openings extend substantially all across the frame space.

5. The screen of claim 1 wherein the screen means is screening material disposed over the plug opening.

6. The screen of claim 1 wherein the screen means is screening material disposed in the plug opening.

7. The screen of claim 1 wherein the frame has holding means and the screen plugs have releasable attachment means that cooperate with the holding means to releasably mount the screen plugs in the frame.

8. The screen of claim 1 wherein the screen means is removably secured to the screen plugs.

9. The screen of claim 1 wherein the screen means comprises a series of openings extending through the plug bodies.

10. The screen of claim 1 wherein each plug body has a threaded end extendable through its respective frame opening and the screen further comprising a threaded nut for each screen plug for mating with the threaded end of the plug body to secure the screen plugs in their frame openings.

11. The screen of claim 1 wherein the frame has a frame top surface and each screen plug has a top surface which does not project above the frame top surface.

12. The screen of claim 1 wherein the plurality of screen plugs includes a first set of screen plugs and a second set of screen plugs, the first set of screen plugs having screening means comprising a first mesh of a first mesh size, and the second set of screen plugs having screening means comprising a second mesh of a second mesh size, the first mesh size different from the second mesh size.

13. The screen of claim 12 wherein the first set of screen plugs are for dewatering the material flowing to the vibratory shaker and the second set of screen plugs are for classifying the material.

14. The screen of claim 1 wherein the frame is substantially flat with a top surface and at least one screen plug has a screening portion that projects above the top surface of the frame.

15. The screen of claim 14 wherein the at least one screen module is all the screen plugs.

16. The screen of claim 14 wherein the frame has a bottom and at least one screen plug has a screening portion that projects below said bottom.

* * * * *